United States Patent [19]
Liu

[11] Patent Number: 5,898,581
[45] Date of Patent: Apr. 27, 1999

[54] ACTIVE SNUBBER FOR BUCK-BASED CONVERTERS AND METHOD OF OPERATION THEREOF

[75] Inventor: Rui Liu, Plano, Tex.

[73] Assignee: Lucent Technologies Inc., Murray Hill, N.J.

[21] Appl. No.: 08/921,995

[22] Filed: Aug. 27, 1997

[51] Int. Cl.[6] .......................... H02H 7/125; H02M 7/00; H02M 5/42
[52] U.S. Cl. .................. 363/53; 363/89; 363/132
[58] Field of Search ................... 363/53, 52, 44, 363/48, 84, 89, 125, 127, 131, 132

[56] References Cited

U.S. PATENT DOCUMENTS

| | | | |
|---|---|---|---|
| 4,336,587 | 6/1982 | Boettcher et al. | 363/134 |
| 5,351,179 | 9/1994 | Tsai et al. | 363/53 |

OTHER PUBLICATIONS

Loveday H. Mweene, Chris A. Wright and Martin F. Schlecht, "A 1 kW. 500 kHz Front–End Converter for a Distributed Power Supply System", 1989 IEEE, pp. 423–432.

J.A. Sabate, V.Vlatkovic, R.B. Ridley and F.C. Lee, "High–Voltage, High–Power, ZVS, Full–Bridge PWM Converter Employing an Active Snubber", 1991 IEEE, pp. 158–162.

Guichao Hua, Fred C. Lee and Milan M. Jovanovic, "An Improved Zero–PWM Converter Using a Saturable Inductor", 1991 IEEE, pp. 189–194.

Pending Patent Application Serial No. 08/664,754, filed on Jun. 17, 1996, entitled "Snubber Circuit for Rectifying Diodes and Method of Operation Thereof", by Rui Liu.

*Primary Examiner*—Peter S. Wong
*Assistant Examiner*—Rajnikant B. Patel

[57] ABSTRACT

For use with a buck-based converter having an isolation transformer, a snubber circuit and a method of damping a transient in the power rectifying diode due to its reverse recovery. In one embodiment, the snubber circuit includes: (1) a capacitor, coupled to a power rectifying diode in the buck-based converter, that receives energy from the power rectifying diode during a reverse recovery period thereof and (2) a flyback converter, coupled to the capacitor, that receives the energy from the capacitor and delivers the energy to a voltage source on the primary side of the isolation transformer.

20 Claims, 6 Drawing Sheets

ACTIVE SNUBBER FOR BUCK-BASED CONVERTERS AND METHOD OF OPERATION THEREOF

TECHNICAL FIELD OF THE INVENTION

The present invention is directed, in general, to power conversion and, more specifically, to an active snubber circuit for use in a buck-based power converter and a method of operating such a converter.

BACKGROUND OF THE INVENTION

A power converter is a power processing circuit that converts an input voltage or current source waveform into a specified output voltage or current waveform. A full-bridge phase-shift pulse-width-modulated power converter (hereinafter referred to as a FPP converter) is a frequently employed switched-mode power converter that converts a direct current (DC) input waveform to a specified DC output waveform. The FPP converter generally includes switching circuitry coupled to an input source of electrical power. The switching circuitry includes two pairs of alternately conducting active switches. A primary winding of a transformer is coupled to the switching circuitry and a secondary winding of the transformer is coupled to a rectifier circuit (e.g., rectifying diodes). The rectifier circuit is coupled through an output filter to a load.

While the FPP converter employs the leakage inductance of the transformer to achieve zero-voltage switching (ZVS) across the active switches, other sources of inefficiencies exist in the FPP converter. More specifically, a parasitic capacitance in the form of the winding capacitance in the transformer and junction capacitance of the rectifying diodes resonate with the leakage inductance thereby inducing transients (e.g., ringing and voltage spikes) in the secondary side of the FPP converter. The transients are intensified in higher power and current applications. The transients are especially harmful to the rectifier circuit and noticeably affect the overall efficiency of the FPP converter.

There have been attempts in the past to minimize the effects of transients in power converters and the resulting stress on rectifier circuits. For instance, a resistor-capacitor-diode (RCD) snubber circuit is disclosed in "A 1 kW, 500 kHz Front-End Converter for a Distributed Power Supply System", by L.H. Mweene et al., Proc. IEEE Applied Power Electronics Conf., p. 423–432 (1989), which is incorporated herein by reference. The RCD snubber circuit not only effectively damps out oscillations in the rectifier's diode voltage, but also recovers a portion of the energy stored in the snubber capacitor to the output. During each switching transient, the reverse recovery energy due to the recovery process of the diodes is first stored in the snubber capacitor followed by a transfer of the energy to the output through the snubber resistor. During this process, some power is dissipated in the snubber resistor. As the output power increases, the power dissipated in the snubber resistor becomes significant thereby limiting the RCD snubber to low power applications. To reduce the power loss in the snubber resistor, a lossless snubber circuit was proposed in "High-Voltage, High-Power, ZVS, Full-Bridge PWM Converter Employing an Active Snubber" by J.A. Sabaste et al., 1991 VEPC Seminar Proc., pp. 158–162, which is incorporated herein by reference.

The lossless snubber circuit operates essentially the same as the RCD snubber circuit described above, except that the energy dumped into the snubber capacitor is recovered to the primary side inductor through an oscillation between the primary side inductor and the snubber capacitor, after the snubber switch is turned on. The snubber circuit will, however, lose its effectiveness when the converter is operated at very small duty ratios, which does not allow time for the energy stored in the snubber capacitor to discharge.

Another component readily employed to reduce the voltage stress on a rectifier circuit is a saturable reactor. A saturable reactor circuit is disclosed in "An Improved Zero-Voltage-Switched Pulse-Width-Modulated Converter Using a Saturable Inductor", by G. Hua et al., IEEE Power Electronics Specialists Conf. Rec., p. 189–194 (1991), which is incorporated herein by reference. Conventionally, a saturable reactor is series-coupled to each rectifying diode of the rectifier circuit. While the saturable reactor does a good job of reducing the reverse recovery of energy of the rectifier circuit, the saturable reactors exhibit losses that result in a relatively high temperature rise across the core and windings thereof. The temperature rise can be alleviated by employing several saturable reactors in parallel, but at the cost of valuable space on the printed circuit board and a prohibitively expensive saturable reactor circuit. As previously mentioned, the aforementioned circuits and other prior art circuits have inadequately dealt with the transients that adversely effect the rectifier circuit in power converters.

Accordingly, what is needed in the art is a snubber circuit for a rectifier circuit that minimizes a voltage stress thereacross to reduce the power losses associated with the rectifier circuit and oscillations in both voltage and current therefrom and is suitable for a vast range of power applications including higher power applications.

SUMMARY OF THE INVENTION

One way to overcome the disadvantages of the prior art described above, is to provide an active snubber circuit, comprising a controllable switch, that receives energy from the snubber capacitor and delivers the same to an output of a buck-based converter by an auxiliary buck converter that forms part of the active snubber circuit. A limitation on such an arrangement is that the active snubber circuit loses its effectiveness when the output voltage decreases due to output current limit or constant output power operation.

To overcome the above-discussed deficiencies of the prior art and further improve upon the active snubber circuit discussed above, the present invention provides, for use with a buck-based converter having an isolation transformer, a snubber circuit and a method of damping a transient in the voltage of the power rectifying diode. "Transient" is defined for purposes of the present invention as a temporary component, such as ringing or spike. In one embodiment, the snubber circuit includes: (1) a capacitor, coupled to a power rectifying diode in the buck-based converter, that receives energy from the power rectifying diode during a reverse recovery period thereof and (2) a flyback converter, coupled to the capacitor, that receives the energy from the capacitor and delivers the energy to a voltage source on the primary side of the isolation transformer.

The present invention therefore introduces the broad concept of routing the reverse recovery energy back to the primary side of the isolation transformer, instead of the buck converter's output, as had been done in the prior art.

In one embodiment of the present invention, the flyback converter comprises an auxiliary switch, an auxiliary diode and an auxiliary transformer having a primary side coupled, via the auxiliary switch, to the capacitor and a secondary side coupled, via the auxiliary diode, to the input voltage source on the primary side of the isolation transformer. In a related embodiment, the flyback converter comprises an auxiliary transformer and an auxiliary diode, coupled to a secondary side of the auxiliary transformer, that prevents the voltage source on the primary side of the isolation transformer from providing power directly to the auxiliary transformer.

In one embodiment of the present invention, the flyback converter comprises an auxiliary switch controllable by a converter controller and operable in a discontinuous conduction mode. In a related embodiment, the snubber circuit further comprises drive signals for power switches, coupled to the primary side of the isolation transformer, that switch to provide input power to the isolation transformer, the flyback converter comprising an auxiliary switch being controllable by a common converter controller. In yet another related embodiment, the snubber circuit further comprises a converter controller, coupled to an auxiliary switch in the flyback converter, that controls the auxiliary switch to maintain a voltage of the capacitor within a desired range.

In one embodiment of the present invention, an output of the buck-based converter is derived from a center tap on a secondary side of the isolation transformer. For purposes of the present invention, the "center tap" does not need to bisect the secondary side. Rather, the "center tap" need only be inboard of tap(s) to which power rectifying diode(s) are coupled.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
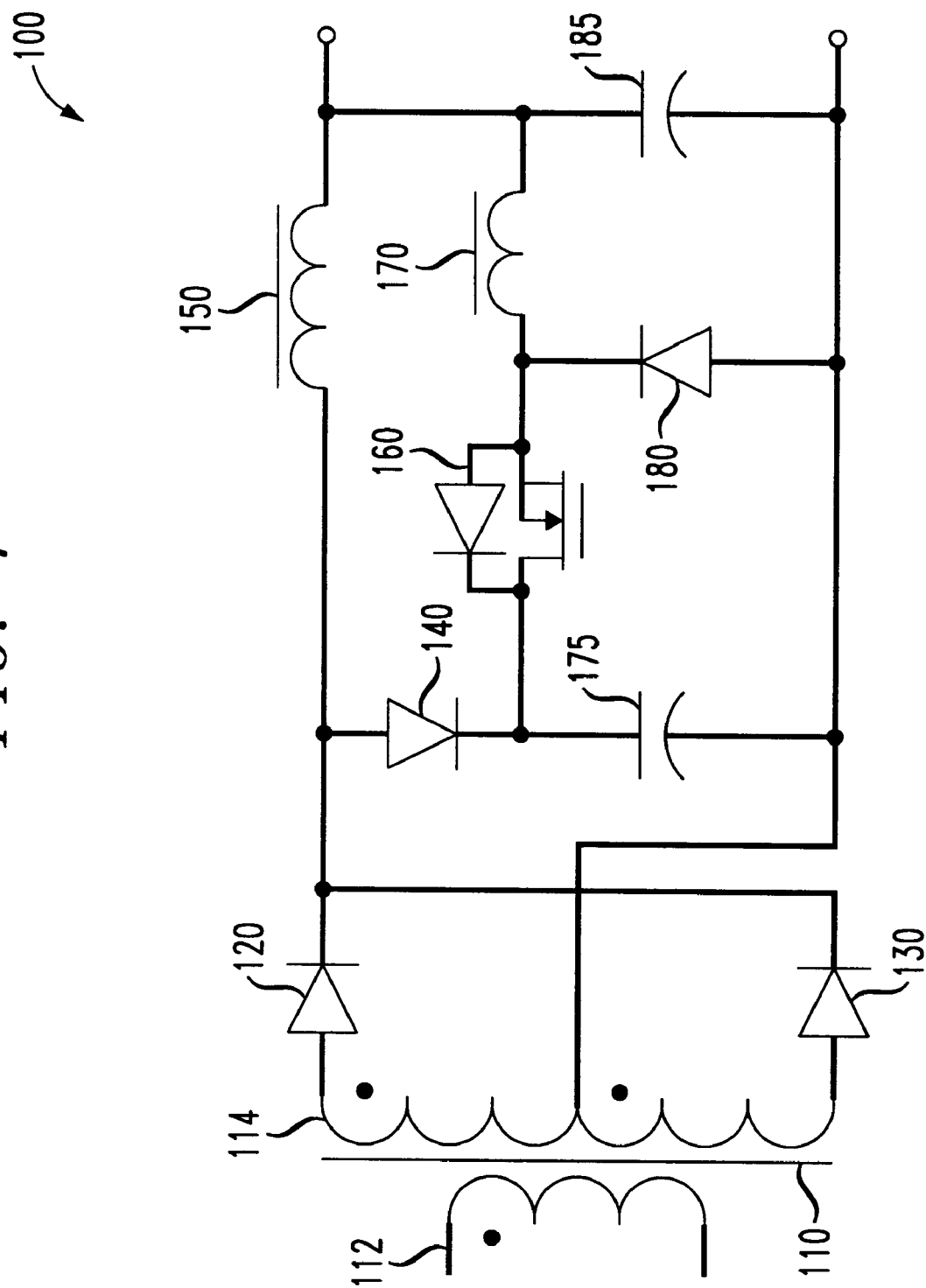
FIG. 1 illustrates a schematic diagram of an output stage of a buck-based DC/DC converter employing an embodiment of an active snubber circuit constructed according to the principles of the present invention.

Referring initially to FIG. 1, illustrated is a schematic diagram of an output stage of a buck-based DC/DC converter 100 employing an embodiment of an active snubber circuit constructed according to the principles of the present invention. The converter 100 includes an isolation transformer 110 consisting of a primary winding 112 and a secondary winding 114. The primary winding 112 is coupled to an input stage (not shown) of the DC/DC converter 100 that typically couples an input power source through controllable switches to the isolation transformer 110. A first and second rectifying diodes 120, 130 are coupled to the outer taps of the secondary winding 114 and to an output inductor 150. The output inductor 150 is coupled to an output capacitor 185 to provide filtering of the output voltage. The active snubber circuit includes first and second snubber diodes 140, 180 that are coupled to an auxiliary switch 160. The auxiliary switch 160 is coupled to a snubber capacitor 175 and an auxiliary inductor 170. The auxiliary inductor 170 is also coupled to the output capacitor 185 that is also coupled to the center tap of the secondary winding 114.

The operation of the active snubber circuit is similar to the RCD snubber circuit, described previously, except that the reverse recovery energy recovered into the snubber capacitor 175 is discharged to the output through a buck converter consisting of the auxiliary switch 160, auxiliary inductor 170 and the second snubber diode 180. The auxiliary switch 160 is controlled by a control circuit (not shown) and the buck converter should be operated in a discontinuous conduction mode to preclude interference with the output voltage. When the output is under a current limit or short-circuited condition, the resulting output voltage is low. If the output voltage is sufficiently low, the current stored in the auxiliary inductor 170 cannot be completely discharged to zero, which will result in the operation of the buck converter in a continuous conduction mode (an undesirable condition).

The present invention also provides for the use of a flyback converter in an active snubber circuit. The flyback converter is used to discharge the energy stored in a snubber capacitor to a voltage source on the primary side of an isolation transformer (input stage of a converter). Since both the input voltage, which is equal to the primary input voltage divided by the isolation transformer turns-ratio, and the output voltage, which is the input voltage source, of the flyback converter are constant, the operation of the snubber circuit of the present invention is independent of the output voltage or the duty ratio of the DC/DC converter.

Figure 2:
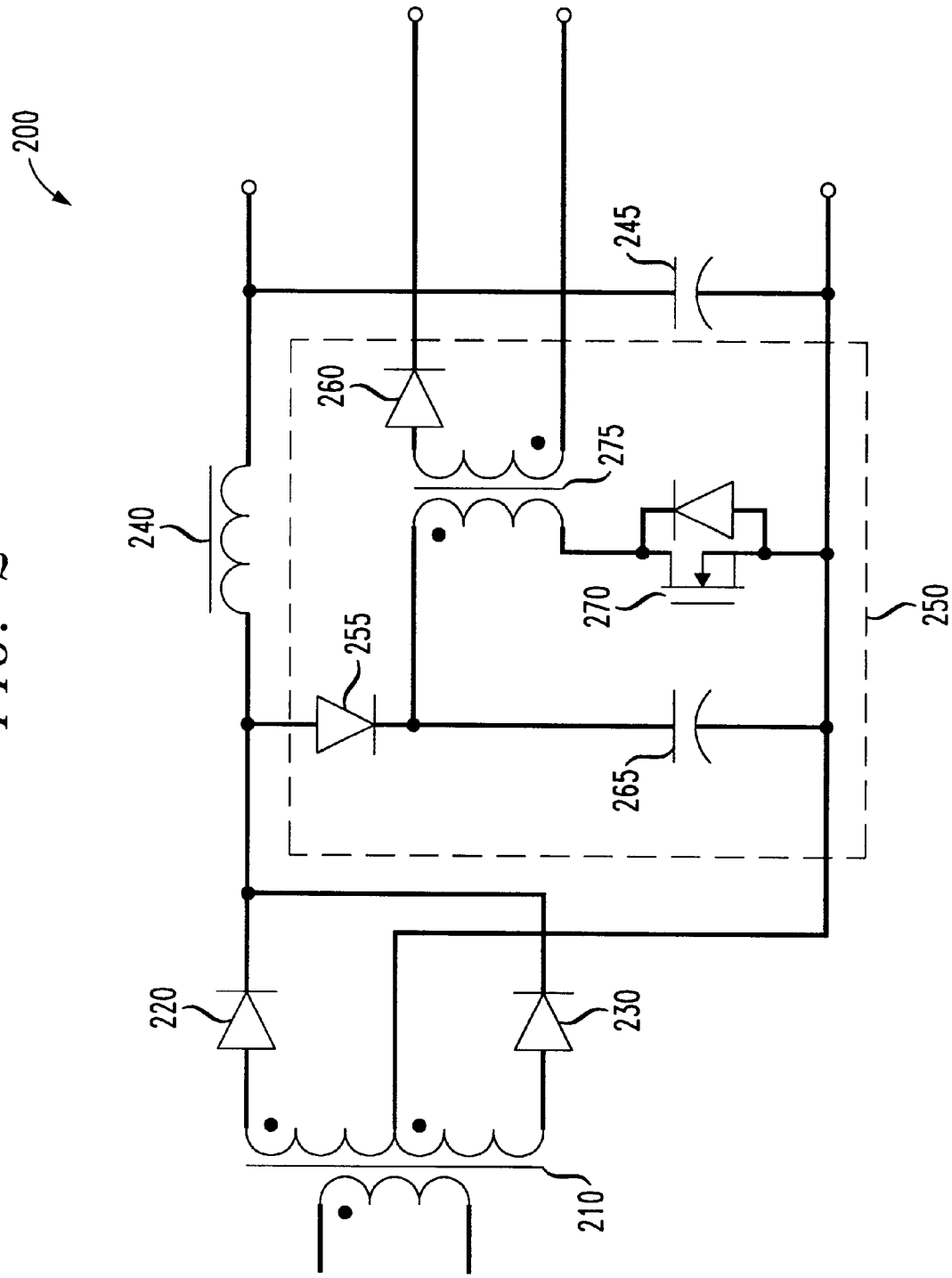
FIG. 2 illustrates a schematic diagram of an output stage of a buck-based DC/DC converter employing another embodiment of an active snubber circuit constructed according to the principles of the present invention.

Turning now to FIG. 2, illustrated is a schematic diagram of an output stage of a buck-based DC/DC converter 200 employing another embodiment of an active snubber circuit constructed according to the principles of the present invention. The DC/DC converter 200, typically a full-bridge phase-shift converter, includes an isolation transformer 210 that is coupled to a first and second rectifying diodes 220, 230. The first and second rectifying diodes 220, 230 are coupled to an output inductor 240 and an active snubber circuit 250. The output inductor 240 is also coupled to an output capacitor 245 that is coupled to the center tap of the isolation transformer 210.

The active snubber circuit 250 includes a snubber diode 255 coupled to a snubber capacitor 265. Also shown is the flyback converter comprising an auxiliary switch 270 and an auxiliary transformer 275 that are coupled to an auxiliary diode 260. The auxiliary switch 270 is controlled by a control circuit (not shown) which provides a switching signal, e.g., pulse-width-modulation (PWM). Those skilled in the art are familiar with PWM controllers and their design. The secondary winding of the auxiliary transformer 275 is coupled back to the primary winding of the isolation transformer 210 and the auxiliary transformer 275 has the same turns-ratio as the isolation transformer 210. The operation of the active snubber circuit 250 will be explained in greater detail with reference to FIG. 3 and with continuing reference to FIG. 2.

Figure 3:
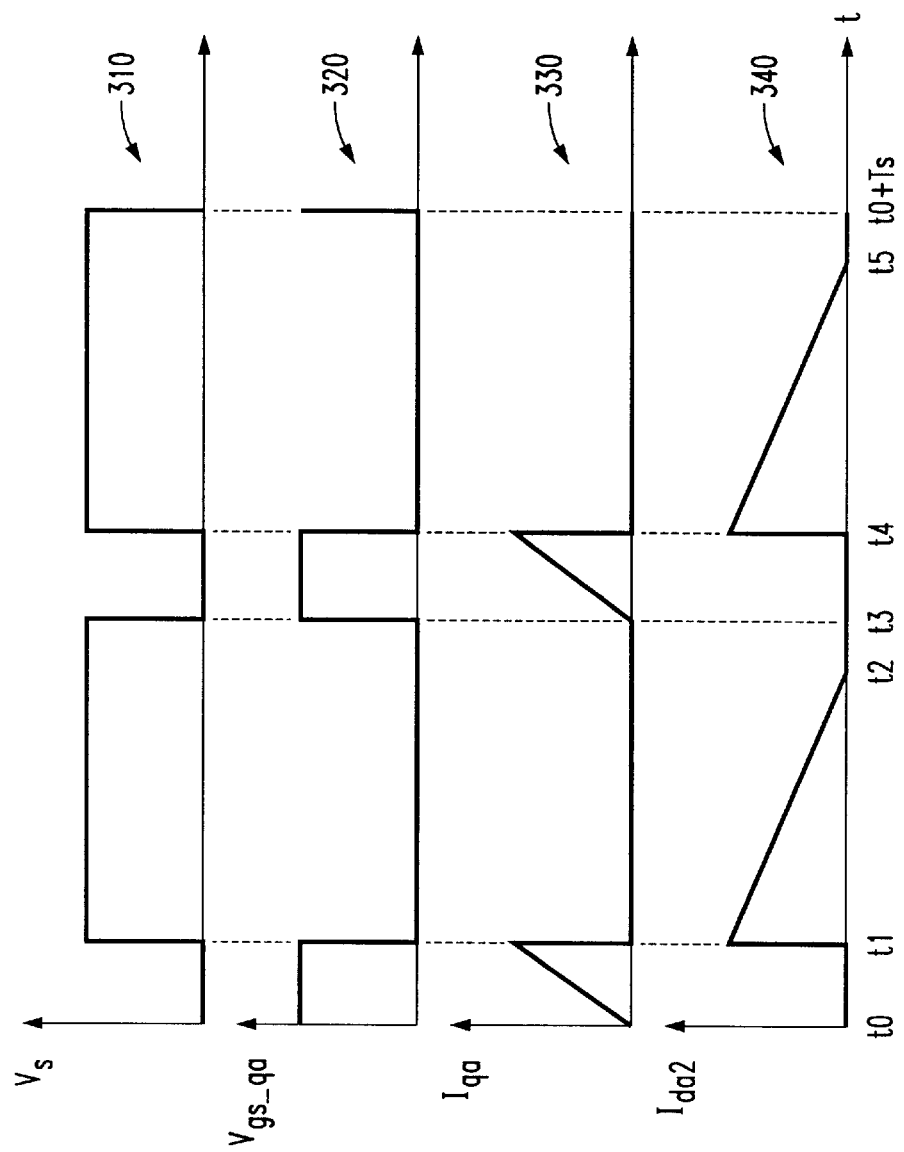
FIG. 3 illustrates exemplary voltage and current waveforms of the DC/DC converter of FIG. 2.

Turning now to FIG. 3, illustrated are exemplary voltage and current waveforms of the DC/DC converter 200 of FIG. 2. A waveform 310 represents a voltage $V_s$ from the anodes of the first and second rectifying diodes 220, 230 to the center tap of the isolation transformer 210. A waveform 320 represents a gate-to-source voltage $V_{gs\_qa}$ of the auxiliary switch 270 and a waveform 330 represents a current $I_{qa}$ through the auxiliary switch 270. A waveform 340 represents a current $I_{da2}$ through the auxiliary diode 260.

During the time intervals (t0 to t1) and (t3 to t4), the input stage of the DC/DC converter 200 or primary side of the isolation transformer 210 is shorted and the auxiliary diode 260 is reverse biased. Also, during these time periods, the auxiliary switch 270 is conducting and the current in the primary side of the auxiliary transformer 275 is being linearly charged from an initial value of zero. At instant t1 or t4, the auxiliary switch 270 is turned off, i.e., not conducting, and the energy stored in the auxiliary transformer 275 is delivered to the input voltage source (not shown) in the input stage of the DC/DC converter 200 through the auxiliary diode 260. The flyback converter in the active snubber circuit 250 is operating in a discontinuous conduction mode. As illustrated in FIG. 3, the charging and discharging rates of the currents in the primary and secondary windings of the auxiliary transformer 275, respectively, are primarily determined by the voltage across the snubber capacitor 265 and the input voltage of the DC/DC converter (not shown). Since both these voltages are constant under any output load conditions, the operation of the active snubber circuit 250 is independent of the duty ratio of the DC/DC converter 200.

The auxiliary switch 270 may be controlled using a PWM control scheme or a hysteresis control scheme. In both control schemes, the voltage that is regulated is the voltage $V_c$ across the snubber capacitor 265 and not the primary bus voltage. If a PWM control scheme is employed, the capacitor voltage $V_c$ is regulated based on a duty cycle basis, whereas, if a hysteresis control scheme is used, the capacitor voltage $V_c$ is loosely regulated within a voltage range. PWM control schemes and their implementation are well known techniques in the art.

Figure 4:
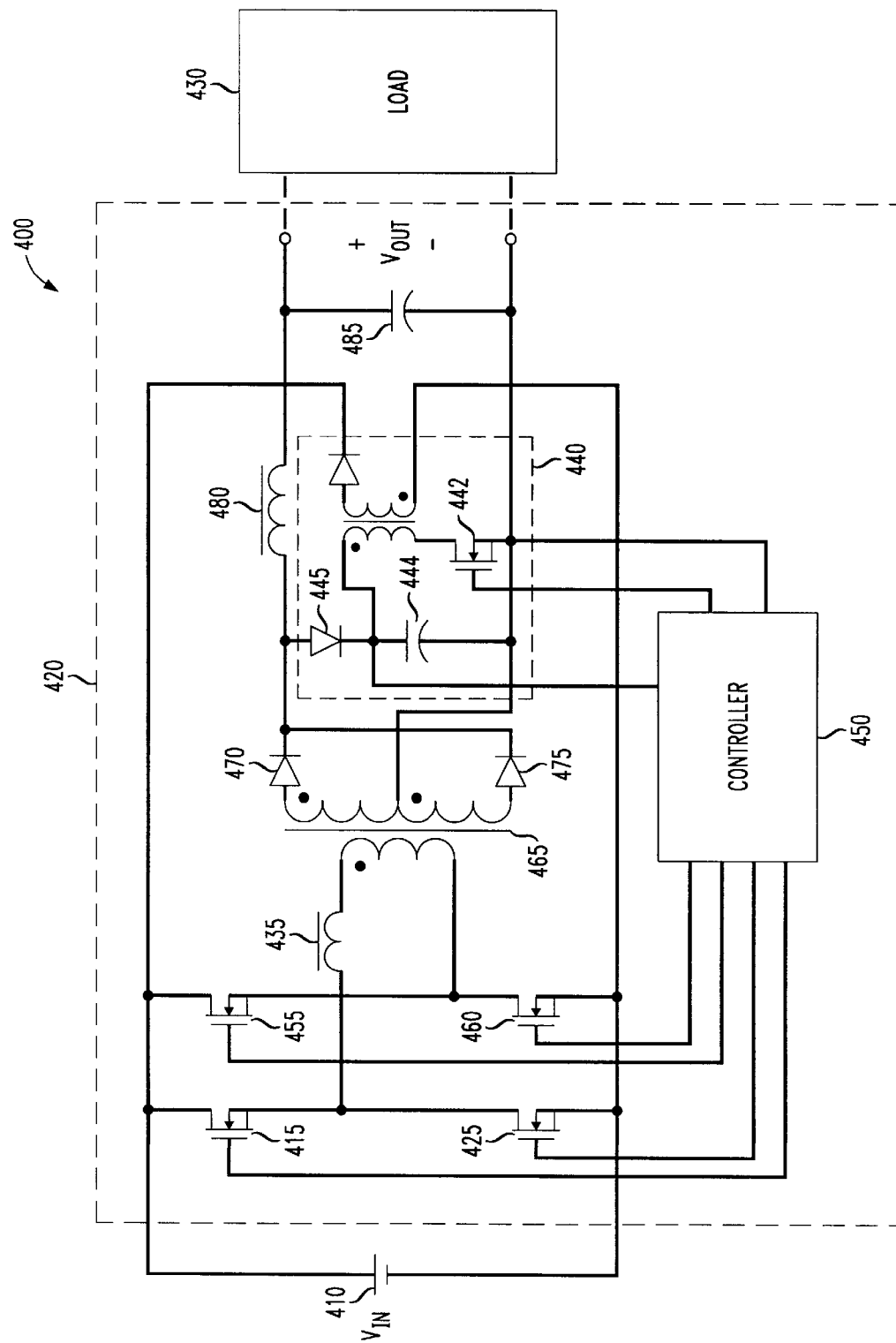
FIG. 4 illustrates a schematic diagram of an exemplary power supply employing another embodiment of an active snubber circuit with a hysteresis controller constructed according to the principles of the present invention.

Turning now to FIG. 4, illustrated is a schematic diagram of an exemplary power supply 400 employing another embodiment of an active snubber circuit 440 with a hysteresis controller 450 constructed according to the principles of the present invention. The power supply 400 includes an input voltage source 410, e.g., a DC bus, coupled to a full bridge phase-shift pulse-width-modulated (PWM) converter 420 that is coupled to a load 430. The converter 420 also includes a power train that comprises a first, second, third and fourth switches 455, 460, 415, 425, an input inductor 435, an isolation transformer 465, first and second power rectifying diodes 470, 475, an output inductor 480 and an output capacitor 485. The converter 420 also includes an active snubber circuit 440 (having a snubber capacitor 444, a snubber diode 445, and a flyback converter) with an auxiliary switch 442 (of the flyback converter) that is controlled by a hysteresis controller 450 based on a voltage measured across the snubber capacitor 444. The hysteresis controller 450 is also coupled to the first and second switch 455, 460 in the input stage of the converter 420.

An implementation of a hysteresis controller 450 and its operation will be explained in greater detail with respect to FIGS. 5 and 6 and with continuing reference to FIG. 4.

Figure 5:
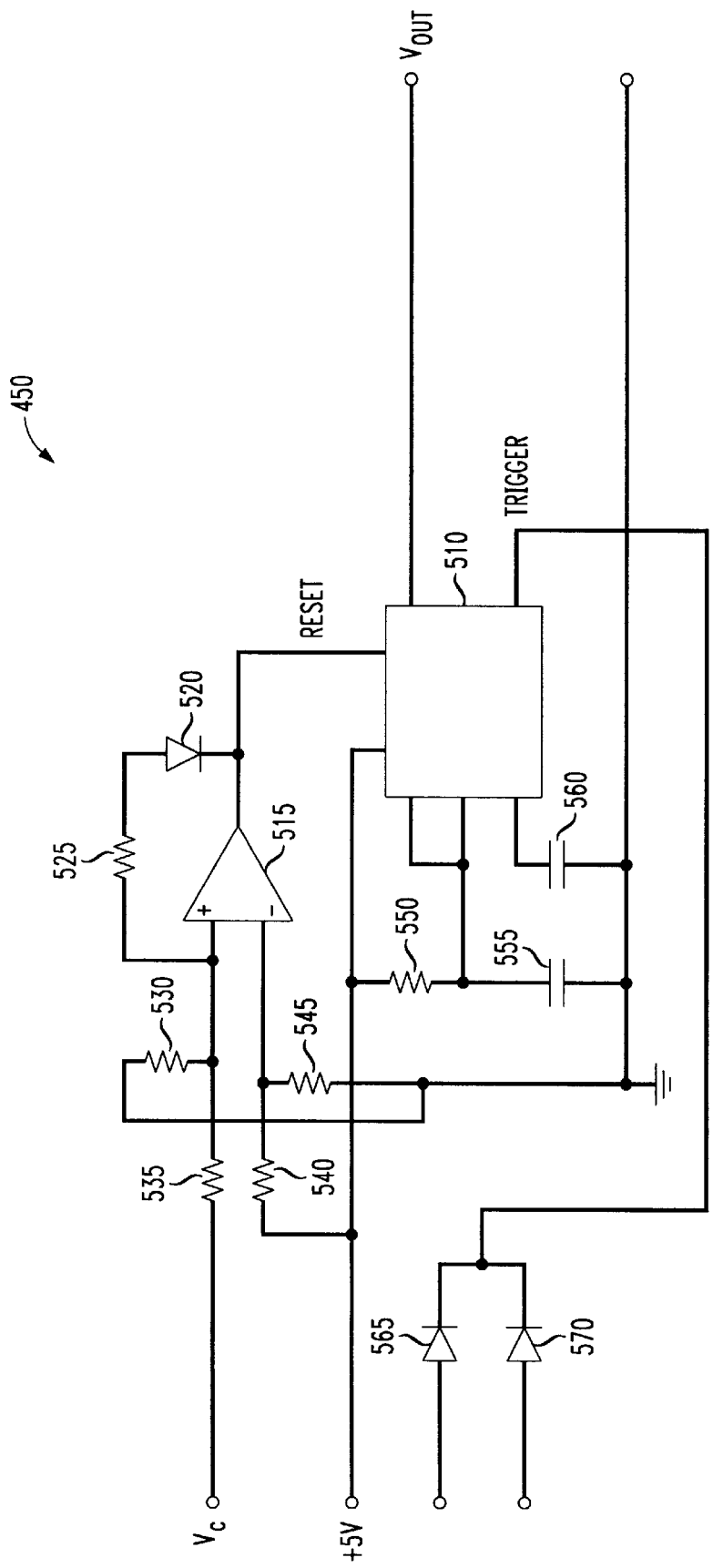
FIG. 5 illustrates a schematic diagram of an embodiment of the hysteresis controller of the power supply of FIG. 4.

Turning now to FIG. 5, illustrated is a schematic diagram of an embodiment of the hysteresis controller 450 of the power supply 400 of FIG. 4. The hysteresis controller 450 includes a first timer IC 510 (e.g., NE555 or MC1455) that is coupled to first and second capacitors 555, 560 and to a second comparator IC 515 (e.g., a comparator IC MC33272). Also shown are first, second, third, fourth, fifth and sixth resistors 525, 530, 535, 540, 545, 550 and first, second and third diodes 520, 565, 570.

Figure 6:
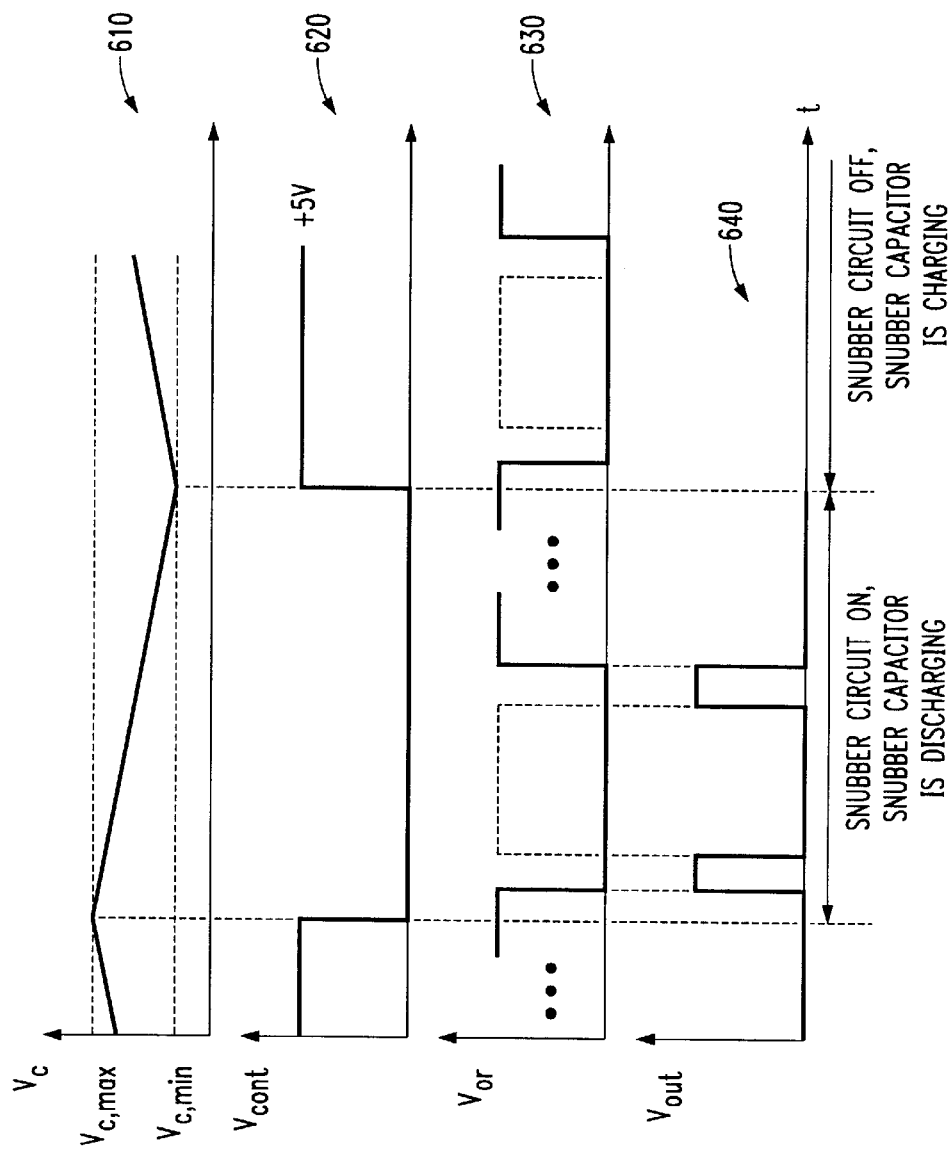
FIG. 6 illustrates exemplary voltage and current waveforms of the power supply of FIG. 4.

Turning now to FIG. 6, illustrated are exemplary voltage and current waveforms of the power supply 400 of FIG. 4. The waveforms 610, 640 represent a voltage $V_c$ measured across the snubber capacitor 444 and a voltage output $V_{out}$ of the hysteresis controller 450 (configured as a monostable circuit). The waveforms 620, 630 represent a triggering signal $V_{or}$ for the first timer IC 510, resulting from ORing the drive signals of the first and second switches 455, 460, and another control signal $V_{cont}$ (at the output of the comparator IC 515) that is used to provide a reset signal to the first timer IC 510.

The first timer IC 510 is used to accomplish a monostable circuit, the voltage output $V_{out}$ of which is used to control the auxiliary switch 442. The second comparator IC 515 is configured as a voltage comparator, with a hysteresis characteristic, and the drive signals for the first and second switches 455, 460 are ORed together through the second and third diodes 565, 570 to provide a control signal to trigger the monostable circuit. The voltage across the snubber capacitor 444 is regulated between a maximum and minimum voltage $V_{c,min}$, $V_{c,max}$ as illustrated in FIG. 6. The negative edges of the control signal $V_{or}$ for the first and second switches 455, 460 are used to trigger the monostable circuit and the pulse width of the monostable output voltage is preset by the sixth resistor 550 and the first capacitor 555.

It is apparent from the above that the present invention provides a snubber circuit and a method of reducing a transient in the voltage of the power rectifying diode. The snubber circuit includes: (1) a capacitor, coupled to a power rectifying diode in the converter, that receives energy from the power rectifying diode during a reverse recovery period thereof and (2) a flyback converter, coupled to the capacitor, that receives the energy from the capacitor and delivers the energy to a voltage source on the primary side of the isolation transformer.

For a better understanding of power electronics, power converter topologies, such as the buck power converter, and snubber circuits, see: "Principles of Power Electronics," by J. Kassakian and M. Schlecht, Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a buck-based converter having an isolation transformer, a snubber circuit, comprising:
   a capacitor, coupled to a power rectifying diode in said buck-based converter, that receives energy from said power rectifying diode during a reverse recovery period thereof; and
   a flyback converter, coupled to said capacitor, that receives said energy from said capacitor and delivers said energy to a voltage source on a primary side of said isolation transformer.

2. The snubber circuit as recited in claim 1 wherein said flyback converter comprises a controllable auxiliary switch and an auxiliary transformer having a primary side coupled, via said auxiliary switch, to said capacitor and a secondary side coupled to said voltage source.

3. The snubber circuit as recited in claim 1 wherein said flyback converter comprises an auxiliary transformer and an auxiliary diode, coupled to a secondary side of said auxiliary transformer, that prevents said voltage source from providing power directly to said auxiliary transformer.

4. The snubber circuit as recited in claim 1 wherein said flyback converter comprises a controllable auxiliary switch controllable by a converter controller and operable in a discontinuous conduction mode.

5. The snubber circuit as recited in claim 1 further comprising power switches, coupled to said primary side of said isolation transformer, that switch to provide input power to said isolation transformer, said flyback converter comprising a controllable auxiliary switch, said power switches and said auxiliary switch being controllable by a common converter controller.

6. The snubber circuit as recited in claim 1 further comprising a converter controller, coupled to a controllable auxiliary switch in said flyback converter, that controls said auxiliary switch to maintain a voltage of said capacitor within a desired range.

7. The snubber circuit as recited in claim 1 wherein an output of said buck-based converter is derived from a center tap on a secondary side of said isolation transformer.

8. For use with a buck-based converter having an isolation transformer and a power rectifying diode coupled thereto, a method of damping a transient in said power rectifying diode, comprising the steps of:

receiving energy from said power rectifying diode during a reverse recovery period thereof; and delivering said energy to a voltage source on a primary side of said isolation transformer.

9. The method as recited in claim 8 wherein said step of delivering comprises the step of operating a controllable auxiliary switch in a flyback converter to deliver said energy from said capacitor to a primary side of an auxiliary transformer, said auxiliary transformer having a secondary side coupled to said voltage source.

10. The method as recited in claim 8 further comprising the step of preventing said voltage source from providing power directly to an auxiliary transformer in a snubber circuit associated with said buck-based converter.

11. The method as recited in claim 8 wherein said flyback converter comprising the step of operating a controllable auxiliary switch in a snubber circuit associated with said buck-based converter in a discontinuous conduction mode.

12. The method as recited in claim 8 further comprising the step of operating power switches, coupled to said primary side of said isolation transformer, and a controllable auxiliary switch in a snubber circuit associated with said buck-based converter with a common converter controller.

13. The method as recited in claim 8 further comprising the step of controlling an auxiliary switch in a snubber circuit associated with said buck-based converter to maintain a voltage of said capacitor within a desired range.

14. The method as recited in claim 8 further comprising the step of deriving an output of said buck converter from a center tap on a secondary side of said isolation transformer.

15. A buck-based converter, comprising:

a power train having an isolation transformer and first and second power rectifying diodes coupled to outer taps of a secondary side of said isolation transformer;

a snubber circuit, including:

a capacitor, coupled to said power rectifying diodes, that receives energy from said power rectifying diode during a reverse recovery period thereof, and a flyback converter, coupled to said capacitor and having a controllable auxiliary switch, that receives said energy from said capacitor and delivers said energy to a voltage source on a primary side of said isolation transformer; and a converter controller, coupled to said auxiliary switch, that provides a control signal to said auxiliary switch to cause said energy to be delivered from said capacitor to said voltage source.

16. The buck-based converter as recited in claim 15 wherein said flyback converter comprises a auxiliary transformer having a primary side coupled, via said auxiliary switch, to said capacitor and a secondary side coupled to said primary side of said voltage source.

17. The buck-based converter as recited in claim 15 wherein said flyback converter comprises a auxiliary transformer and an auxiliary diode, coupled to a secondary side of said auxiliary transformer, that prevents said voltage source from providing power directly to said auxiliary transformer.

18. The buck-based converter as recited in claim 15 wherein said converter controller operates said auxiliary switch in a discontinuous conduction mode.

19. The buck-based converter as recited in claim 15 further comprising power switches, coupled to said primary side of said isolation transformer, that switch to provide input power to said isolation transformer, said converter controller commonly controlling said power switches and said auxiliary switch.

20. The buck-based converter as recited in claim 15 wherein said converter controller controls said auxiliary switch to maintain a voltage of said capacitor within a desired range.

* * * * *